United States Patent

[11] 3,628,340

[72] Inventors: Joseph Meisler, Teaneck, N.J.; Edward Harold Van Baush, Pearl River; Gregory Christ Banikiotes, Seaford, both of N.Y.
[21] Appl. No.: 876,294
[22] Filed: Nov. 13, 1969
[45] Patented: Dec. 21, 1971
[73] Assignee: Hydrocarbon Research, Inc., New York, N.Y.

[54] PROCESS FOR CRYOGENIC PURIFICATION OF HYDROGEN
2 Claims, 1 Drawing Fig.

[52] U.S. Cl. .................................................. 62/18, 62/23, 62/40
[51] Int. Cl. .................................................. F25j 3/00, F25j 3/06, F25j 3/08
[50] Field of Search ....................................... 62/23, 24, 40, 9, 11

[56] References Cited
UNITED STATES PATENTS

| | | | |
|---|---|---|---|
| 3,359,744 | 12/1967 | Bolez ........................... | 62/23 |
| 1,913,805 | 6/1933 | Hausen ........................ | 62/23 |
| 3,119,677 | 1/1964 | Moon ........................... | 62/23 |
| 3,363,428 | 1/1968 | Charlesworth ............... | 62/23 |
| 3,543,529 | 12/1970 | Knapp .......................... | 62/23 |
| 3,224,211 | 12/1965 | Karbosky ..................... | 62/40 |

Primary Examiner—Norman Yudkoff
Assistant Examiner—Arthur F. Purcell
Attorneys—Nathaniel Ely and Bruce E. Hosmer ABSTRACT: A process for separating condensable contaminants such as methane from a crude hydrogen stream utilizing a series of multipass heat exchangers through which the gas flows for stepwise cooling, with interstage separation of condensates which are expanded and passed in a reverse flow path for autogenous refrigeration. Supplemental refrigeration is provided for the last cooling stage to maintain the plant in proper heat balance for variations in feed gas composition and to facilitate startup.

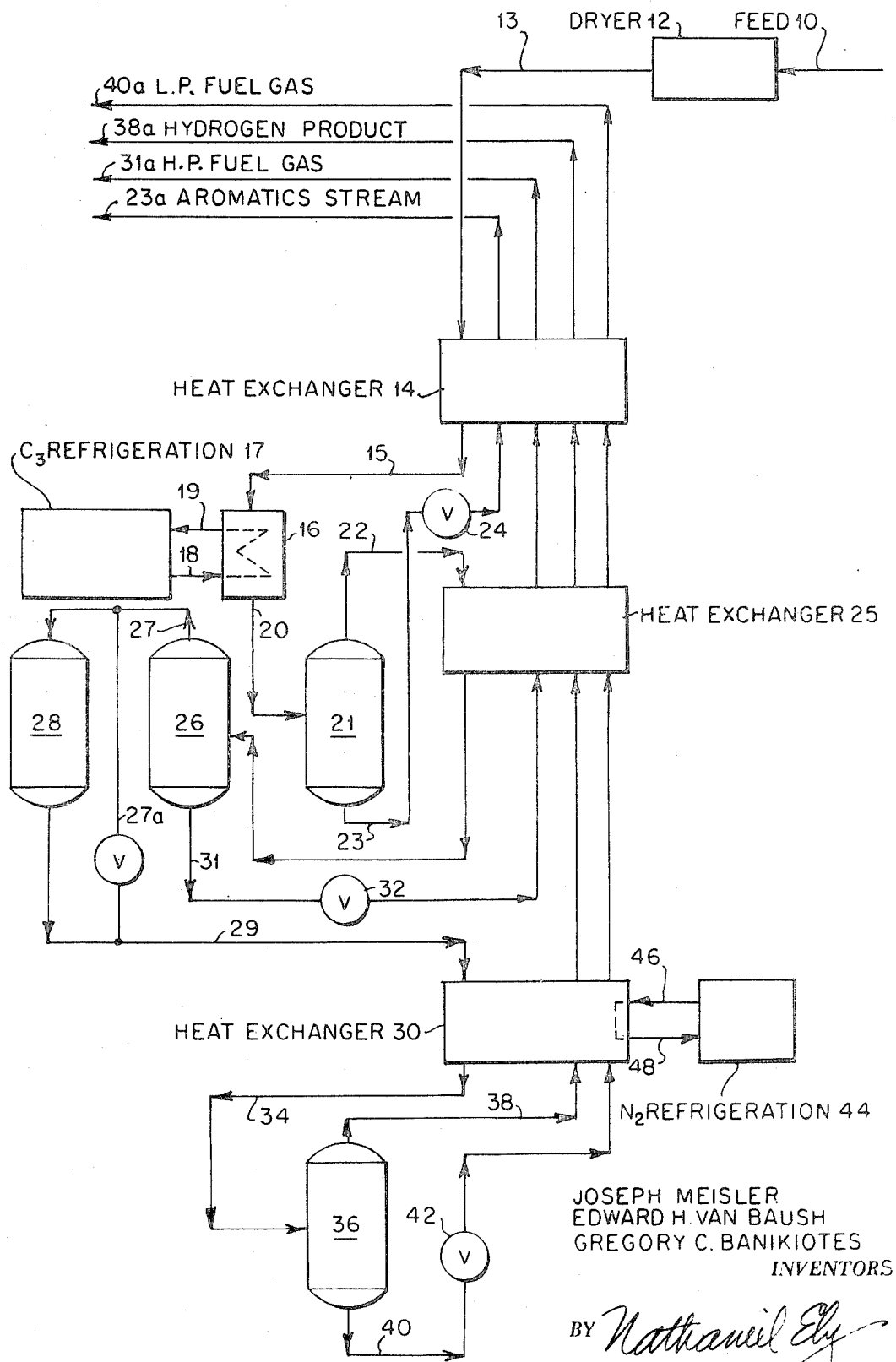

PROCESS FOR CRYOGENIC PURIFICATION OF HYDROGEN

BACKGROUND OF THE INVENTION

Cryogenic purification of crude gases, including hydrogen utilizing a series of cooling stages has been known. It has been found, however, that unless the feed gas pressure was sufficiently high or waste gases were throttled to an inordinately low pressure, there was not enough refrigeration effect to make the separation of the impurities effective. The reuse of hydrogen, for many hydrogenation processes, requires a high purity product with the absence of contaminants that otherwise effect the reaction.

SUMMARY OF THE INVENTION

The present invention is particularly applicable to purifying a crude hydrogen stream which contains approximately 45 to 65 percent hydrogen with substantial amounts of methane and lesser amounts of other hydrocarbon contaminants, for reuse in a hydrodealkylation reaction with a hydrogen purity requirement of at least 90 percent. A minimum pressure drop and temperature drop of the hydrogen through the system is accomplished so that the product is substantially available for reuse. The contaminants are recovered in the form of high pressure fuel gas, low pressure fuel gas and a light hydrocarbon stream. External refrigeration is used to maintain the plan in proper heat balance for control, and to expedite plant startup.

DESCRIPTION OF THE DRAWING

The drawing is a schematic flow sheet showing the various vapor lines, heat exchangers, and related equipment whereby the invention is accomplished.

DESCRIPTION OF A PREFERRED EMBODIMENT OF THE INVENTION

The crude hydrogen feed gas at about 650 pounds per square inch absolute (p.s.i.a.) at 10 is initially dried in dryers 12 to a dew point lower than −100° F. The dried gas is then passed by line 13 into the first stage multistream heat exchanger 14 for cooling to about −26° F. Cooling in this exchanger, as well as in some later exchangers, is accomplished by indirect transfer of heat to discharge streams as hereinafter described.

The partially cooled gas feed stream is next further cooled as by passing through the external heat exchanger 16. The refrigeration for this exchanger is preferably supplied by a propylene refrigerant at about −40° F. This is passed into heat exchanger 16 by line 18 and the vaporized propylene recycled back through line 19 to the refrigeration unit 17. The temperature of the exit stream 20 is now about −30° F.

This further cooled stream 20 now enters a phase separator 21 from which partially purified gas is removed at 22 and a condensate is removed at 23. With the gas feed described above and the temperatures encountered, the bottoms stream is primarily aromatics. It is expanded in Joule-Thompson valve 24 to a cold vapor which is passed backward through heat exchanger 14 from which it picks up heat from the feed stream 13. The aromatics stream now discharging from heat exchanger 14 through line 23a is at about 50° F. and approximately 250 p.s.i.a.

The gaseous (partially purified) stream 22 now is further cooled in the second multistream heat exchanger 25 wherein it is reduced in temperature to about −210° F. dew point, similarly through indirect heat exchange from other streams passing therethrough. It then enters phase separator 26 and again a gaseous overhead is removed at 27 and a condensate is removed at 31.

The gaseous overhead 27 which may contain some aromatics is passed primarily through a guard chamber 28 having an activated charcoal bed for the removal of the trace aromatics. The net gas from guard chamber 28, and from bypass line 27a passes by line 29 to the final multistage heat exchanger 30.

At the same time, the condensate 31 is removed from phase separator 26, is expanded in Joule-Thompson valve 32 and the vapor-liquid mixture, which is mostly light hydrocarbons, including ethane, methane and some heavier hydrocarbons, at about 80 p.s.i.a. now passes reversely through exchangers 25 and 14. It discharges as a high pressure fuel gas at 31a.

The substantially purified gas from line 29 which is cooled in final heat exchanger 30 to about −236° F. by line 34 enters phase separator 36 from which the purified hydrogen is removed overhead at 38. This stream now passes through the several multistream heat exchangers and is removed at 38a as hydrogen product. Its pressure is approximately 625 p.s.i.a. and its temperature is about ambient.

The liquid bottoms 40 from phase separator 36 passes through a Joule-Thompson valve 42 reducing the pressure to about 50 p.s.i.a. The resulting liquid-vapor mixture then also passes through the several multistream heat exchangers and discharges as low pressure fuel gas at 40a.

In a cryogenic system of this type the amount of refrigeration required to condense a particular condensable (hydrocarbon) impurity will depend not only on pressure but concentration. It is thus essential, where the impurities may vary from time to time, to operate with the optimum equipment which can be supplemented in an extreme case by external refrigeration. We have found, for example, that the amount of refrigeration that is not available as a rule, from hydrodealkylation off gases, is relatively small, but critical. To such extent, rather than take greater pressure drop in the waste gases, we have found it desirable to add a nitrogen subcooling to the final heat exchanger.

As more specifically shown, this external unit at 44 supplies liquid (or vapor) nitrogen in line 46 which is evaporated in the exchanger 30 and returned to the external unit through the line 48. Temperatures as low as −265° F. can be obtained by such a system.

As hereinbefore mentioned, the economical operation of a cryogenic hydrogen purification plant depends on the optimum temperature control at the predetermined levels required for the condensation of the impurities. We find that whereas the nitrogen circuit on the final exchanger is particularly beneficial, nevertheless, this unit is made as small as possible by using the propylene refrigerant unit 17 for supplying some of the load at the higher temperature.

It can be seen from the foregoing that the present process provides a method for purifying a hydrogen feed stream. By keeping each separate expanded condensate fraction in its own effluent vapor line, a complete separation of the respective fractions is obtained at the outflow from the process. The hydrogen that is produced has a hydrogen purity of greater than 90 percent. As this is not mixed with any of the condensate fractions during any of the refrigeration stages, the amount of hydrogen product that is obtained is not sacrificed in an effort to obtain greater cooling effect. The external nitrogen refrigeration system provides refrigeration and serves to reduce the final stage temperature to the level required to produce a highly pure product. Also we are able to recover the fuel values of the separated contaminant streams.

The invention is applicable to the following range of conditions:

| | |
|---|---|
| Pressure, feed | 400–900 p.s.i.a. |
| Hydrogen concentration-feed | 45–65% by volume |
| Product H₂ purity | 90–97% by volume |

While we have shown and described preferred forms of embodiment of the invention, we are aware that modifications may be made thereto which we consider to be within the scope and spirit of the disclosure herein and of the claims appended hereinafter.

We claim:

1. A process for the cryogenic purification of a gas stream containing 45 to 65 percent hydrogen which is at a pressure between about 400 and 900 p.s.i.a. which comprises:
   a. drying said gas stream by an adsorption expedient to a dew point lower than −100° F. for removal of entrained water therefrom;
   b. cooling said dry gas stream in a first heat exchange means to about −26° F. through indirect counter current flow with product streams from the process;
   c. separating a partially purified gas stream overhead and a first liquid aromatics bottoms fraction in a first phase separator;
   d. expanding said first bottoms to a first vapor-liquid mixture and passing it reversely through said first heat exchange means to remove it as an aromatics product at about 50° F.;
   e. further cooling said partially purified gas stream to about at least as low as −210° F. in a second heat exchange means through indirect counter current flow with the lower temperature product streams from the process;
   f. separating a further purified gas stream overhead and a second liquid bottoms in a second phase separator;
   g. expanding said second bottoms to a second vapor-liquid mixture comprising methane, ethane and heavier hydrocarbons and passing said second mixture reversely through said second heat exchange means and then through said first heat exchange means;
   h. removing trace aromatics from said further purified gas stream in (f);
   i. further cooling said further purified gas stream in (h) to about at least as low as −236° F. in a third heat exchange means through indirect counter current flow with the lower temperature product streams from the process;
   j. separating a hydrogen gas overhead of 90 to 97 percent purity and a third liquid bottoms in a third phase separator;
   k. expanding said third bottoms to form a third vapor-liquid mixture and passing said third mixture reversely through said third and said second and said first heat exchange means to recover a low pressure fuel gas;
   l. passing said hydrogen gas reversely through said third and said second and said first heat exchange means to recover an ambient product at a reduced pressure resulting from the pressure drop inherent in the system;
   m. maintaining an external nitrogen sub-cooling means connected with said third heat exchange means to provide critical cooling requirements down to at least as low as −265° F.

2. The process of claim 1 wherein the partially cooled gas stream from step (b) is further cooled to about at least as low as −30° F. by a first external heat exchange means.

* * * * *